July 18, 1950 W. COSBY 2,515,698
CHICKEN FEEDER
Filed March 5, 1946
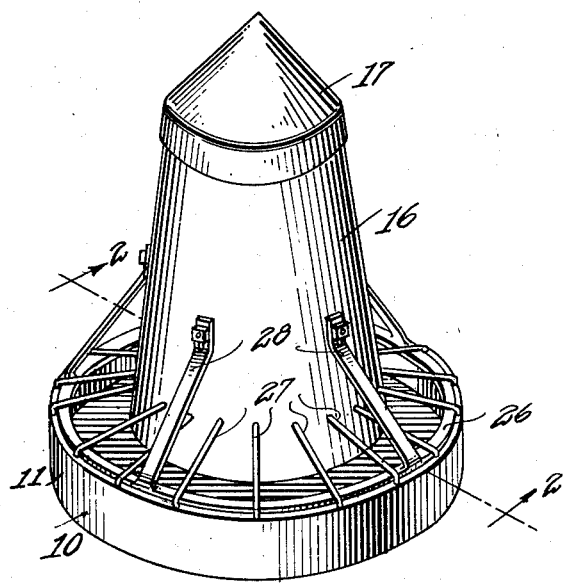
FIG. 1.
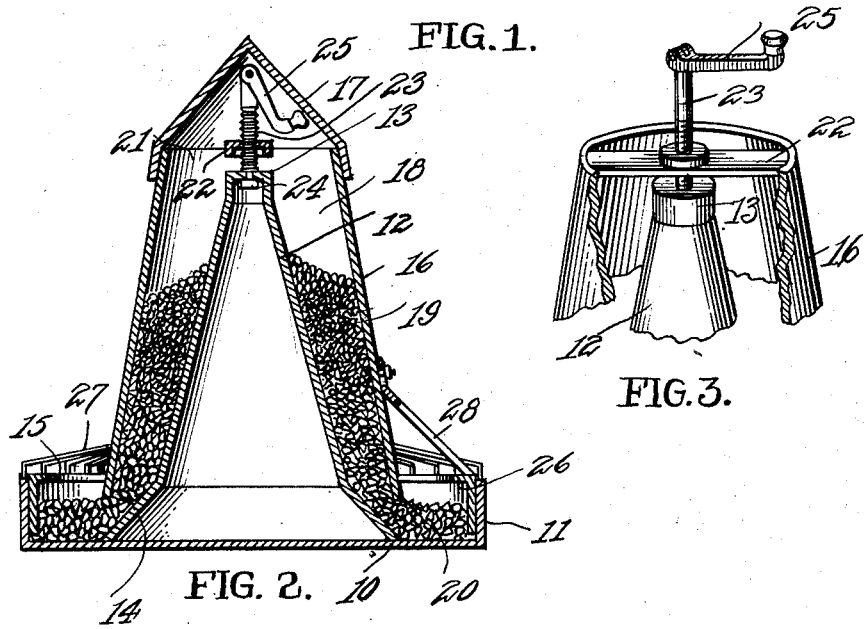
FIG. 2.
FIG. 3.
INVENTOR.
*WHEELER COSBY*
BY *Victor J. Evans & Co.*
ATTORNEYS Patented July 18, 1950

2,515,698

UNITED STATES PATENT OFFICE 2,515,698

CHICKEN FEEDER

Wheeler Cosby, Battle Ground, Ind.

Application March 5, 1946, Serial No. 652,028

1 Claim. (Cl. 119—53)

The invention relates to a feeder and more especially to a chicken feeder.

The primary object of the invention is the provision of a feeder of this character, wherein the feed within is delivered by gravity to a feeding position and such feeder is of circular contour with its feeding tray or pan entirely about the same thereby enabling the chickens to acquire the feed from any side thereof.

Another object of the invention is the provision of a feeder of this character wherein the flow of the feed within can be regulated in a novel manner, the feeder being of a construction to prevent the chicks from scratching the feed within the pan or tray.

A further object of the invention is the provision of a feeder of this character, wherein the construction thereof is novel and the assembly of the parts thereof unique, the chickens being prevented from roosting on the same, and is automatic in the feeding operation.

A still further object of the invention is the provision of a feeder of this character, which is simple in construction, thoroughly reliable and efficient in operation, strong, durable, readily portable, neat in appearance, conveniently adjusted for regulating the feeding operation and inexpensive to manufacture.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a perspective view of the feeder constructed in accordance with the invention.

Figure 2 is a sectional view taken on the line 2—2 of Figure 1 looking in the direction of the arrows.

Figure 3 is a fragmentary perspective, partly broken away of the adjustment assembly of the feeder.

Similar reference characters indicate corresponding parts throughout the several views in the drawings.

Referring to the drawing in detail, the feeder constituting the present invention comprises in this instance a circular pan or tray-like bottom feed section 10 having marginally thereof an upstanding outer wall 11, while rising centrally from this section is a cone-shaped column 12, with a truncated top end 13, the lowermost portion 14 of this column being flared, between which and the wall 11 is a feeding zone 15.

Overhanging the column 12 is an upwardly tapered covering section 16, which has a sloping crown 17 at its top and this section at its lower open end is dependent within the zone 15, while between the column 12 and the section 16 is a feed storage space or compartment 18, its feed 19 being adapted to gravitate through a throat 20 directly into the zone 15 to be acquired by chickens from entirely about the feeder.

The covering section 16 has its crown 17 detachably fitted thereto, so that on removal of the latter the space or compartment 18 can be filled with feed 19 as best seen in Figure 2 of the drawing. This open end 21 of the section 16 has a cross web formation 22 in which is threaded an adjusting screw 23 swiveled in the truncated top end 13 of the column 12, the swivel being indicated at 24, and this screw 23 is fitted with a foldable operating handle 25 which in folded condition is accommodated within the crown 17 when placed on the cover section 16 as best seen in Figure 2 of the drawing.

The bottom feed section 10 has telescoped therein a guard flange 26, while overhanging the feed zone 15 is a grating 27, and rising from the wall 11 of the pan or tray section 10 and angled to the vertical are braces 28 which are adjustably connected at 28 to the section 16 exteriorly thereof. The screw 23 when manually operated permits the raising and lowering of the covering section 16 to increase or decrease the throat 20 communication between the compartment 18 and the zone 15, thus increasing or decreasing the low of gravity feed of the contents of the feedings within the said compartment to the latter, as should be obvious.

What is claimed is:

A feeder comprising a tray-like bottom having an upstanding wall, a cone shaped column having a flared lowermost portion which is centrally disposed on the tray and a truncated closed top, an adjusting screw swiveled in the closed top of the cone shaped column, an upwardly tapered open ended covering section surrounding the cone and adapted to contain the food, said section having a cross member at the open end thereof in threaded engagement with the adjusting screw, an operating formation on the adjusting screw to effect its adjustment and the adjustment of the lowermost portion of the covering section with relation to the tray-like bottom and the lower end of the covering section to increase or decrease the distance between the lowermost portion and the lower end of the covering section, braces extending upwardly from the upstanding wall of the tray-like bottom and against the covering section, the upper end of said braces having elongated slots, bolts extending from the covering section and through the elongated openings to permit the adjustment of the covering section, said food being confined between the cone shaped column and the covering section, said operating formation comprising a handle foldable on the adjusting screw, and a sloping crown adapted to fit over the covering section when the handle is folded downwardly onto the adjusting screw.

WHEELER COSBY.

REFERENCES CITED

The following references are of record in the file of this patent:

UNITED STATES PATENTS

| Number | Name | Date |
|---|---|---|
| 900,851 | Hatch | Oct. 13, 1908 |
| 905,393 | Webb | Dec. 1, 1908 |
| 984,980 | Taylor | Feb. 21, 1911 |
| 1,131,491 | Drake | Mar. 9, 1915 |
| 1,520,607 | Smith | Dec. 23, 1924 |
| 1,649,250 | Patterson | Nov. 15, 1927 |
| 2,165,121 | Amstutz | July 4, 1939 |